United States Patent

[11] 3,583,767

| [72] | Inventors | Richard A. Unverferth;<br>Melvin E. Bonomo; Carl M. Kahle, all of Kalida, Ohio |
|---|---|---|
| [21] | Appl. No. | 772,495 |
| [22] | Filed | Nov. 1, 1968 |
| [45] | Patented | June 8, 1971 |
| [73] | Assignee | Unverferth Manufacturing Company Inc.<br>by said Unverferth, said Kahle |

[54] DUAL WHEEL MOUNTING ASSEMBLY
12 Claims, 5 Drawing Figs.
[52] U.S. Cl. ................................................ 301/39
[51] Int. Cl. ........................................... B60b 11/06
[50] Field of Search ......................... 301/39, 36, 9 TV

[56] References Cited
UNITED STATES PATENTS
| 3,223,455 | 12/1965 | Hammer | 301/39 |
| 3,337,270 | 8/1967 | Peterson | 301/39 |
| 3,359,039 | 12/1967 | Theissen | 301/39 |

*Primary Examiner*—Richard J. Johnson
*Attorney*—Molinare, Allegretti, Newitt & Witcoff ABSTRACT: A wheel-mounting assembly for mounting an auxiliary wheel to a vehicle-mounted wheel includes a plurality of eyes attached to the lugs which mount the vehicle-mounted wheel rims to the axle of the vehicle. An annular T-shaped rail is carried on the inner circumference of the auxiliary wheel rim and a plurality of channel block members are slideably introduced onto a flange portion of the rail at an interruption in the rail. The channel block members each include a connector hook, each channel block and its connector hook being positioned in alignment with one of the eyes, and a tension member draws a tension on the connector hook to draw the wheel rims together and wedge the channel block member in a fixed position with respect to the flange of the T-shaped rail. The channel block member includes flanges which cooperate with the rail to prevent loss of the assembly when the tension is released.

PATENTED JUN 8 1971 3,583,767
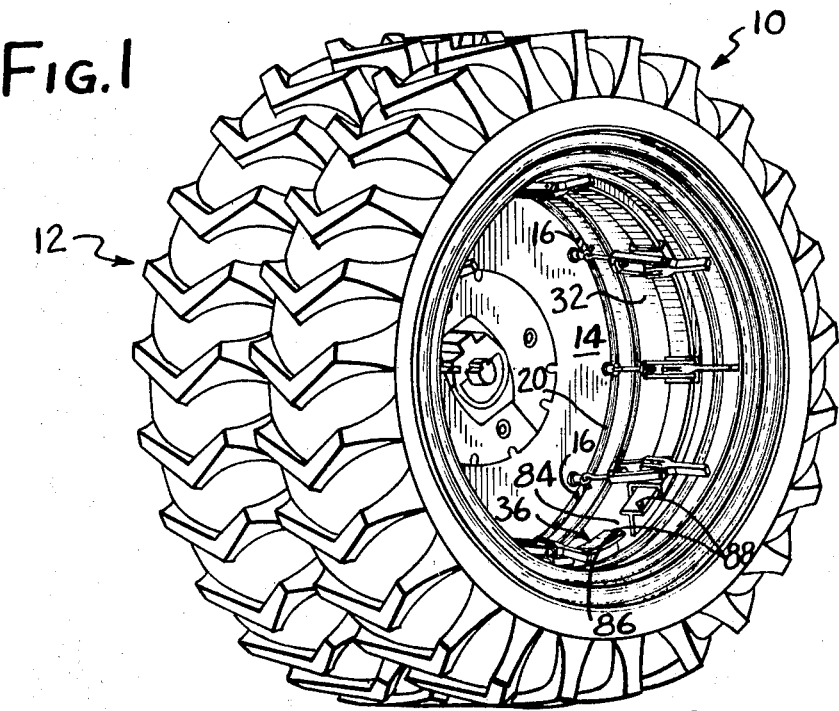
Fig.1
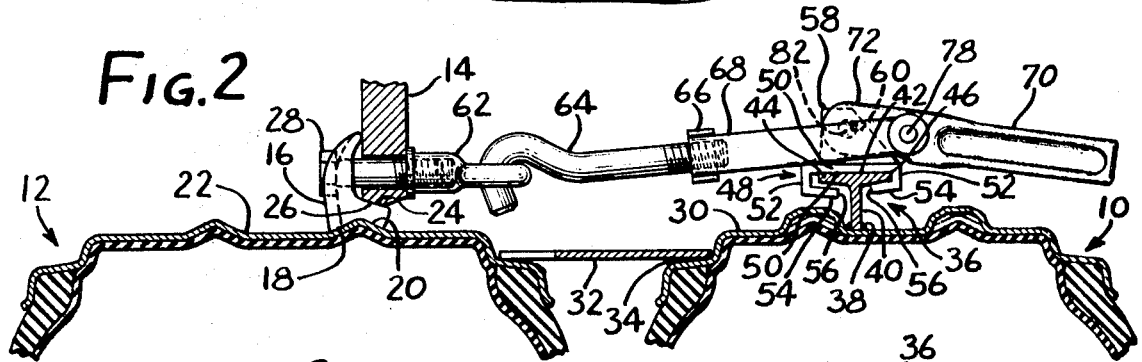
Fig.2
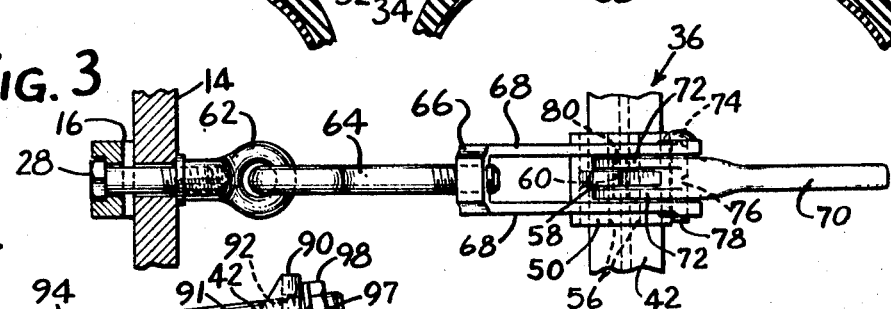
Fig.3
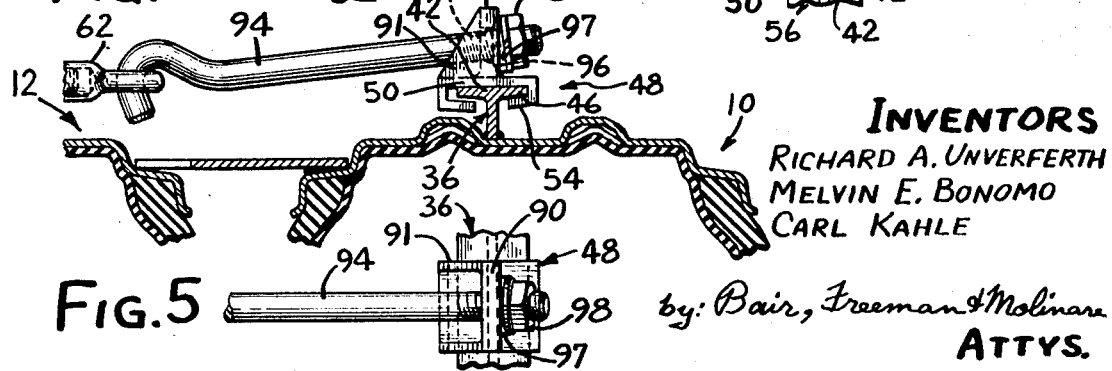
Fig.4
Fig.5
INVENTORS
RICHARD A. UNVERFERTH
MELVIN E. BONOMO
CARL KAHLE
by: Bair, Freeman & Molinare
ATTYS.

DUAL WHEEL MOUNTING ASSEMBLY

BACKGROUND OF THE INVENTION

This invention relates to a dual wheel-mounting assembly and, more particularly, to an assembly for attaching an auxiliary wheel to another vehicle-mounted wheel.

In the past, various wheel-mounting assemblies have been provided for attaching auxiliary vehicle wheels in dual wheel relationship to primary wheels mounted on the vehicle axle to improve traction and the like. One such assembly which takes the form of an eye mounted on selected ones of the lugs which mount the primary wheel rim to the axle hub is described in the U.S. Pat. of Hammer, Pat. No. 3,223,455 issued Dec. 14, 1965. A plurality of brackets are welded about the inner circumference of the auxiliary wheel rim in such position that the brackets are aligned with selected ones of the lugs and eyes and lever operated hook connectors are attached between the brackets and aligned eyes, tension being taken on the lever to draw the respective wheel rims together. In such arrangement the stationary brackets must be selectively prearranged on the inner circumference of the auxiliary wheel rim, the prearranged location of the brackets being dependent upon the number and position of the lugs on the primary wheel. In such assembly where the brackets are positioned for use with a six lug primary wheel, the wheel mounting assembly cannot be used to mount the auxiliary wheel to an eight lug primary wheel and vice versa unless additional brackets, in excess of the number used at any one time, are also attached to the inner circumference of the auxiliary wheel rim. Even where such excess brackets are provided, if the auxiliary wheel was previously mounted on a primary wheel of the six lug variety and is presently desired to be mounted on a primary wheel of the eight lug variety, the lever and connector must be moved from the six lug brackets to the eight lug brackets. Such relocation is time consuming and tedious and frequently requires the use of additional tools, particularly where the connector and lever are semipermanently attached to the brackets.

Another prior wheel mounting assembly comprises the hook connector and eye arrangement as previously described, but the end of the hook opposite the eye passes through a moveable L-shaped angle bracket having a single flange which extends under an overhanging annular plate which, in turn, is welded in partial overhanging relationship to the inner circumference of the auxiliary wheel rim, the overhang extending in one direction only. The single flange of the L-shaped bracket extends between the overhanging portion of the plate and inner circumference of the auxiliary wheel rim and, when tension is drawn on the hook connector by a bolt and nut arrangement, the L-shaped bracket grasps the overhanging plate. Such assembly overcomes the aforementioned difficulties encountered with the plural stationary spaced bracket arrangement previously described. However, should the bolt assembly become loose during operation, the connecting hook and L-shaped bracket is subject to loss since the hook and bracket are maintained in position only by the bolt tension.

Another prior wheel mounting assembly includes a plurality of elongated spacers permanently welded at one end to the auxiliary wheel rim and extending outwardly therefrom, the extended ends each having a flange thereon. To attach the auxiliary wheel to the primary wheel, the extended flanged ends of the spacers are positioned adjacent the primary wheel rim and a plurality of flanged brackets are positioned over the flanges of the spacers. A bolt, attached at one end to the primary wheel rim and at the other end to the flanged bracket, is then tightened to hold the extended end of the spacer and its associated auxiliary wheel rim tightly against the primary wheel rim. Such arrangement is cumbersome to handle since the permanently extending spacers are difficult to position relative to the bolts, particularly since the wheels are usually of relatively large size. The spacers must also be relatively heavy to prevent bending and subsequent misalignment with the bolts. Also the bolts and their flanged brackets are subject to loss in the event that the bolt becomes loose during operation. As in the stationary bracket arrangement previously described, the number and arrangement of the spacers are dictated by the number of lugs on the primary wheel thus requiring the proper prearrangement of the spacers.

The multiple wheel-mounting assembly incorporating the principles of our invention overcomes the many disadvantages found in the prior assemblies. The wheel-mounting assembly of our invention will not be lost in the event that the tension on the connector member is accidentally released during the course of operation. Also the wheel-mounting assembly of our invention is capable of easy and rapid manipulation when mounting the auxiliary wheel to the primary wheel of the vehicle and may be readily employed irrespective of the number or position of the lugs on the primary wheel thus obviating the need for a specialized structure on the auxiliary wheel to allow interchangeable use with differing lugged primary wheels. Moreover, the wheel-mounting assembly of our invention may be rapidly and easily slid into position with respect to the lugs on the primary wheel while also having the capability of being firmly wedged into its final position when the wheels are drawn together in attached relationship. The wheel-mounting assembly constructed in accordance with the principles of our invention is not limited by the requirement of a specified number of connector members, the number of connector members being variable as desired.

SUMMARY OF THE INVENTION

In a principal aspect, the wheel-mounting assembly incorporating the principles of our invention includes an annular rail located on the inner circumference of the auxiliary wheel rim, the rail including a web extending from the auxiliary wheel rim and a flange extending generally perpendicularly to the web and spaced from the inner circumference of the auxiliary wheel rim. A channel block member is carried on the rail and includes a pair of flanges which cooperate with the rail to prevent detachment of the channel block member from the rail. An elongated connecting means is attached at one end to the vehicle-mounting wheel and the other end is connected to the channel block member and tension means is provided to draw tension on the connecting means to firmly attach the wheels together.

These and other objects, features and advantages of the present invention will become evident upon consideration of the following detailed description.

BRIEF DESCRIPTION OF THE DRAWINGS

In the course of this detailed description the drawings will frequently be referred to in which:

FIG. 1 is an overall view of a pair of vehicle wheels mounted together by a preferred embodiment of wheel-mounting assembly constructed in accordance with the principles of our invention;

FIG. 2 is an enlarged cross-sectional elevation view of the vehicle wheels and one preferred embodiment of wheel-mounting assembly of our invention;

FIG. 3 is a plan view of the wheel-mounting assembly of FIG. 2;

FIG. 4 is a fragmentary enlarged cross-sectioned elevation view of a second preferred embodiment of wheel-mounting assembly constructed in accordance with the principles of our invention; and FIG. 5 is a fragmentary plan view of the wheel-mounting assembly of FIG. 4.

DETAILED DESCRIPTION OF THE PREFERRED EMBODIMENTS

Referring to FIGS. 1—3, a preferred embodiment of wheel-mounting assembly is shown for attaching an auxiliary vehicle wheel 10 to a primary vehicle wheel 12, the latter wheel being mounted on the axle of a vehicle, such as a tractor. In a conventional manner, the primary wheel 12 is attached to the hub 14 of the axle by a plurality of mounting lugs 16. Each lug includes a notched end 18 which is adapted to fit over an annular rib 20 about the inner circumference of the primary wheel rim 22 and an inclined surface 24 which is arranged to be drawn into wedged relationship with a similarly inclined surface 26 provided about the periphery of the axle hub 14 when the lug and hub are drawn together with a bolt 28.

The auxiliary vehicle wheel 10 which is to be mounted to the primary wheel 12 includes a wheel rim 30 and tire similar in construction to the primary wheel, and a spacer member 32 is provided which is welded at 34 to the auxiliary wheel rim 30 for spacing the wheels from each other by a predetermined distance. A substantially T-shaped annular rail 36 is firmly affixed to the inner circumference of the wheel rim 30, as by welding at 38, and includes an upstanding web 40 and a flange 42 which caps the web and overhangs at 44 and 46 on each side of the web, the flange 42 being spaced from the inner circumference of the wheel rim 30.

A channel block member 48 is provided which comprises a flat web 50 having a width somewhat greater than the flange 42, a pair of flanges 52 extending substantially perpendicularly from each edge of the web 50, and a pair of flanges 54 extending from the edge of flanges 52 into underlying relationship with the overhanging sides 44 and 46 of flange 42. The flanges 54 are spaced from the web 50 of the channel block in varying degree such that the edge 56 of each flange 54 is spaced a greater distance from the web 50 than are the edges of the flanges adjacent flanges 52. The latter spacing is the minimum spacing of the flanges and is substantially equal to the thickness of the overhanging sides 44 and 46 of flange 42. An upwardly extending bracket 58 is formed integrally on the top of the web 50 and includes an aperture 60, the bracket being generally arranged in a plane which is perpendicular to the plane of the axle hub 14.

The nut of the conventional mounting bolt 28 is replaced with a threaded eye 62 which is threaded down on the bolt 28 to firmly mount the primary wheel rim 22 to the axle hub 14 via its mounting lug 16. An elongated connector hook 64 is inserted through the eye 62 at one end, the other end being threaded through a yoke 66. The yoke 66 includes a pair of parallel arms 68 which are arranged to straddle the bracket 58 and extend beyond the bracket. A lever 70 is provided which includes a pair of arms 72 which are arranged to also straddle the bracket 58 and loosely lie between the bracket and the arms 68 of the yoke 66. Apertures 74 and 76 are provided through the distal ends of the yoke arms 68 and intermediate the ends of the lever 70, respectively, and a pivot pin 78 is inserted through apertures 74 and 76. Apertures 80 are also provided in the distal ends of the lever arms 72 and the lever 70 is pivotally attached to the bracket by a second pivot pin 82 which extends through the apertures 60 and 80.

To attach the auxiliary wheel 10 to the primary wheel 12, the auxiliary wheel is maneuvered into a position adjacent the primary wheel, the spacer 32 being positioned upon the primary wheel rim 22, as shown in FIG. 2. A plurality of channel block members 48 and their associated hooks 64 and levers 70 are positioned upon the flange 42 of the T-shaped rail 36 such that the flanges 54 of the channel members are disposed between the overhang 44 and 46 of flange 42 and the inner circumference of the auxiliary wheel rim 30. In order to enable the channel block members to be located on the T-shaped rail, the rail 36 is interrupted at 84 so that the channel members may be moved into an axially aligned position with the rail. When so aligned, the channel block members may be slideably moved over the length of the rail 36 until each is in alignment with the desired eye 62. When each channel member 48 and its hook 64 and lever 70 have been slideably aligned with the desired eye, the hook is inserted through the eye and the lever 70 is rotated about pin 82 toward the auxiliary wheel rim 30, as shown in FIG. 2, drawing a tension on the hook and firmly drawing the wheels together. Since flanges 54 are spaced a varying distance from web 50 of the channel block member 48, the channel members are readily slideable in straddling relationship to flange 42 along the length of the T-shaped rail, so long as lever 70 is raised in the nontension drawing position. However, when tension is drawn on the hook connector 64 by rotation of the lever 70, the channel member moves to the left, as viewed in FIG. 2, and the overhang 46 of flange 42 becomes firmly wedged into the decreasing space between flange 54 and the web 50 to firmly maintain the channel block member 48 in position on the rail 36. Since the block members 48 and their associated hooks may be readily positioned anywhere on the auxiliary rim, the number of block members may be readily varied for any given tire arrangement, more or fewer block members being employed as desired. The only limitation on the number of block members employed, is that a sufficient number is used so as to maintain the tires together during use.

In the event that one of the assemblies inadvertently becomes loose during operation, it will not be lost as a result. The loosened assembly will merely slide around the T-shaped rail 36 until it comes into contact with the next adjacent properly tensioned assembly and, at most, will merely move back and forth on the rail between adjacent assemblies. The loosened assembly will not fall from the rail due to the straddling cooperation of the channel block 48 and flange 42 of the rail. In the event that one of the assemblies adjacent the interruption 84 becomes loose during operation, loss of the assembly may be avoided merely by tapping a small aperture 86 through the flange 42 of the T-shaped rail adjacent each side of the interruption, and inserting a removable pin 88 in each aperture. Thus, the sliding assembly will merely contact the pin 88 and stop without entering the rail interruption.

Referring to FIGS. 4 and 5, a second embodiment of wheel-mounting assembly is shown. Since many of the components of the second embodiment are substantially similar in many respects to the assembly components previously described, like reference numerals will be employed to designate substantially like components. In this embodiment the bracket 90, formed integrally on the channel block member 48, lies in a plane substantially parallel to the axle hub 14 of the vehicle and is reenforced by suitable supporting webs 91. An aperture 92 is provided in the bracket and a connector hook 94 is hooked through the eye 62 on the primary wheel lug 16 at one end and extended through the aperture 92 at the other end. The aperture 92 is slightly countersunk at 96 and a spherical washer 97 is positioned over the threaded end of the connector hook and positioned in the countersunk portion 96 of the aperture. A nut 98 is threaded on the threaded end of the connector hook 94 and tightened down with a suitable wrench or the like to bear against the bracket 90 and move the channel block member 48 to the left, as viewed in FIG. 4, firmly wedging overhang 46 of flange 42 of the T-shaped rail 36 into the decreased width space between the flange 54 and the web 50, firmly affixing the primary and auxiliary wheels together as previously described.

It should be understood that the embodiments of the invention which have been described are merely illustrative of some of the applications of some of the principles of the invention. Numerous modifications may be made by those skilled in the art without departing from the true spirit and scope of the invention.

We claim:

1. A wheel-mounting assembly for mounting an auxiliary wheel to a vehicle-mounting wheel, said assembly comprising;

an annular rail attached to the inner circumference of the rim of the auxiliary wheel, channel means circumferentially slideably carried on said rail, elongated connecting means adapted to be attached at one end to the rim of the vehicle-mounting wheel and attached at its other end to said channel means, tension means for drawing tension on said connecting means to firmly attach the wheels together, and means cooperatively associated with said channel means and said rail for loosely maintaining said channel means on said rail and positively preventing accidental loss from said rail when the tension on said tension means is relaxed.

2. The assembly of claim 1 wherein said elongated connecting means includes a hook and an eye member adjacent said one end for attaching said connecting means to the vehicle wheel, said hook removably extending through said eye member.

3. The assembly of claim 1 wherein said one end of said connecting means is attached to lug means for mounting said vehicle wheel on the axle of the vehicle.

4. The assembly of claim 1 wherein said tension means comprises a bracket extending from said channel means, and bolts means at said other end of said connecting means attaching said connecting means to said bracket.

5. The assembly of claim 1 wherein said tension means comprises a bracket extending from said channel means, and elongated lever means pivotally attached intermediate its ends to said connecting means and pivotally attached at one end to said bracket, whereby when said lever means is pivoted about said bracket said wheels are firmly drawn together.

6. The assembly of claim 1 wherein said rail is substantially T-shaped in cross section and includes a web attached to and extending substantially perpendicularly from the inner circumference of the rim and a flange overhanging the web of said rail on each side and spaced from the inner circumference of said rim, and said channel means comprises a web positioned on the side of the flange of said rail opposite the web of said rail and first and second flanges on said channel means which depend from the web of said channel means and which are positioned between said overhanging flange and the inner circumference of said auxiliary wheel rim.

7. The assembly of claim 6 wherein at least one of said first and second flanges is variably spaced from the web of said channel means such that when tension is drawn on said tension means the flange of said rail is wedged between the web and flange of said channel means.

8. The assembly of claim 1 wherein said annular rail is interrupted over a minor portion of its length for insertion and removal of said channel means from said rail.

9. The assembly of claim 8 including means adjacent said minor portion for preventing movement of said channel means into the interrupted minor portion.

10. The assembly of claim 9 wherein said means for preventing movement comprises at least one aperture in a flange of said rail and a pin removably carried in said aperture.

11. The assembly of claim 1 wherein said rail includes a web attached to and extending from the inner circumference of said rim and a flange attached to said web in spaced relationship to the inner circumference of said rim and overhanging the web of said rail on each side thereof, and said means for maintaining said channel means on said rail comprise projecting means attached to and spaced from a web of said channel means, said projecting means projecting between the overhanging flange and the inner circumference of said rim on each side of said rail web.

12. The assembly of claim 11 wherein said projecting means comprise a pair of flanges, one on each side of said rail web.